Patented Jan. 20, 1942

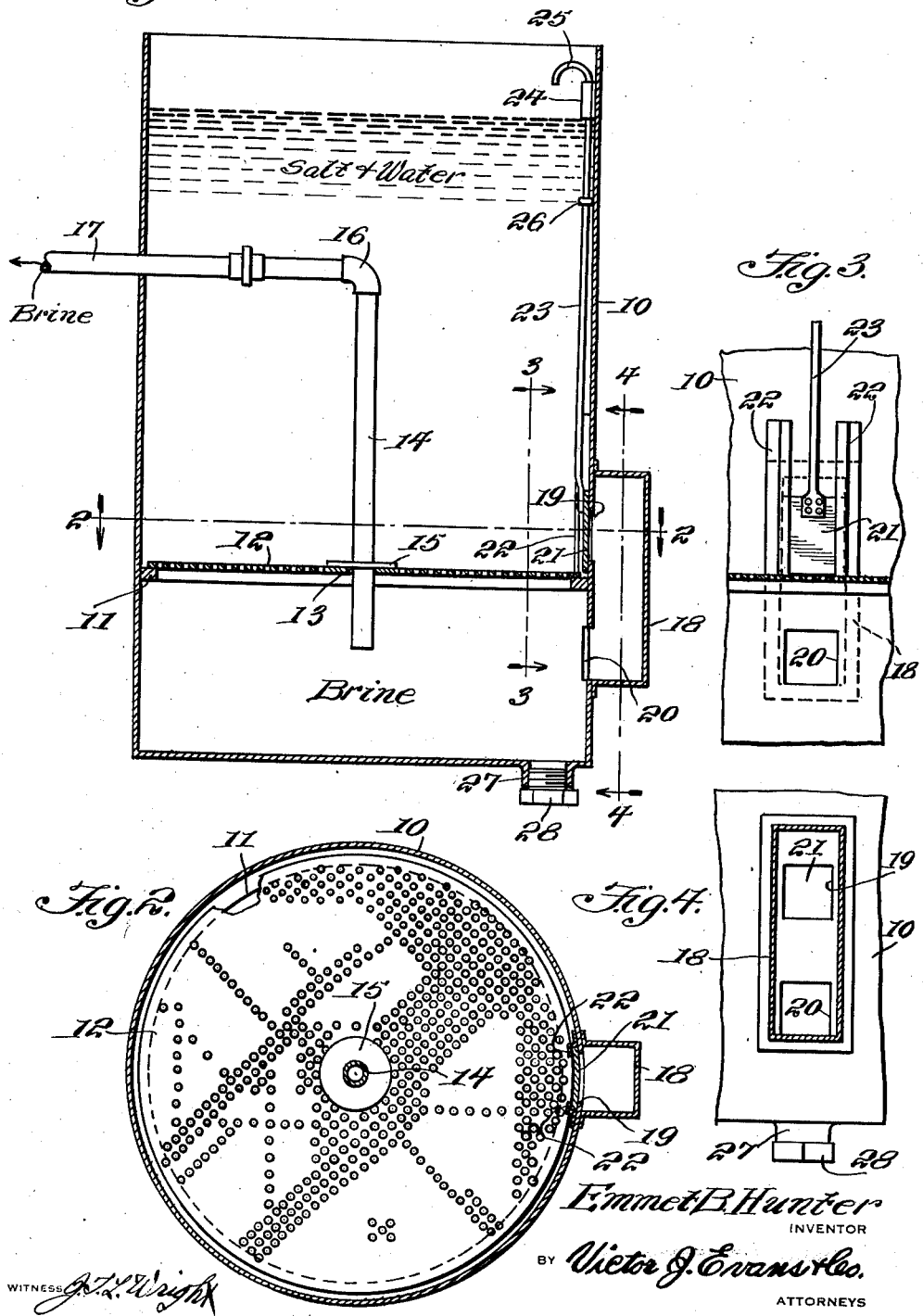

2,270,372

UNITED STATES PATENT OFFICE 2,270,372

BRINE APPARATUS

Emmett B. Hunter, Sioux City, Iowa

Application May 13, 1940, Serial No. 334,966

2 Claims. (Cl. 23—272)

This invention relates to brine apparatus and has for an object to provide apparatus for more efficiently manufacturing brine than conventional devices of this type.

A further object is to provide brine apparatus which may be thoroughly cleaned in much less time than it ordinarily takes to clean similar apparatus.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of brine apparatus constructed in accordance with the invention.

Figure 2 is a cross sectional view of the apparatus taken on the line 2—2 of Figure 1.

Figure 3 is a detail longitudinal sectional view taken on the line 3—3 of Figure 1 showing the valve in the cleaning pipe.

Figure 4 is a longitudinal sectional view taken on the line 4—4 of Figure 1.

Referring now to the drawing in which like characters of reference designate similar parts in the various views, 10 designates a cylindrical tank having an open top. Adjacent the bottom of the tank a ring 11 of the same diameter as the tank is secured to the wall of the tank concentric with the tank and forms a ledge to receive a circular perforated plate 12. The plate is provided with a central opening 13 to receive a brine outlet pipe 14 which extends to a point adjacent the bottom of the tank. A collar 15 is secured to the pipe and engages the top face of the plate to support the pipe on the plate. At a point above the plate the pipe is turned at a right angle as shown at 16 and extends through the side of the tank as shown at 17 where it may be connected to a suitable brine receptacle not shown.

A cleaning pipe 18, in the form of a casing of U-shape in cross section, is secured to the wall of the tank and extends above and below the plate 12. A large port 19 is formed in the wall of the tank and communicates with the cleaning pipe above the plate 12 and a similar port 20 is formed in the wall of the tank and communicates with the cleaning pipe below the plate 12.

A substantially rectangular valve 21, similar in shape to the port 19 but of greater longitudinal and cross dimension than the upper port 19, is mounted at the edges in angular guide flanges 22 disposed on the inner surface of the wall of the tank. A rod 23 is secured at the lower end to the valve 21 and extends upwardly through a cylindrical guide 24 which is secured to the inner surface of the tank near the top thereof. The top of the rod is provided with a handle 25 for raising and lowering the rod to open and close the valve 21. A stop collar 26 is disposed on the rod below the guide 24 and engages the guide when the valve is being opened to limit upward movement of the valve so that it will not pass out of the guide flanges 22.

A drain pipe 27 is disposed in the bottom of the tank and is closed by a removable plug 28.

In operation, the tank is filled with salt to any desired height and water is then let into the top of the tank to dissolve the salt. As the brine solution rises to the level of the horizontal portion 17 of the brine outlet pipe 14, it is caused to flow into the receptacle provided therefor.

To clean the apparatus it is simply necessary to open the valve 21 and remove the plug 28 of the drain pipe 27. The interior of the tank, the plate 12 and the cleaning pipe 13 may then be quickly and conveniently cleaned through the open top of the tank.

From the above description it is thought that the construction and operation of the invention will be fully understood without further explanation.

What is claimed is:

1. Brine apparatus comprising, a tank open at its top, a perforated plate disposed transversely in and forming a false bottom in the tank for supporting a supply of salt above the bottom of the tank, an outlet pipe extending through the plate and terminating above the bottom of the tank, a vertically disposed clean out pipe disposed exteriorly of the tank and opening at the top and at the bottom into the tank respectively above and below the plate, a vertically slidable gate valve in the tank controlling the upper open end of the pipe, a handle for the valve disposed at the top of the tank, and a drain plug in the tank.

2. Brine apparatus comprising, a tank open at the top, a perforated plate supported above the bottom of the tank to receive a supply of salt, an outlet pipe extending through the center of the plate having the intake end below the plate and above the bottom of the tank, a vertically disposed clean out casing on the exterior of the tank, upper and lower ports in the wall of the tank communicating with the casing respectively above and below the plate, said casing forming a by-pass around the plate, a vertically slidable valve closing the upper port, angular guide flanges carried by the inner surface of the wall of the tank retaining the valve in position, and a handle connected to the valve and extending to a point adjacent to the top of the tank.

EMMETT B. HUNTER.